United States Patent
Chang (10) Patent No.: US 8,459,845 B2
(45) Date of Patent: Jun. 11, 2013

(54) LIGHT GUIDE LENS WITH CURVED SURFACE PARTS THAT REFLECT LIGHT INTO AN ASYMMETRICAL PATTERN, AND BICYCLE HEADLIGHT INCLUDING THE SAME

(75) Inventor: Kuo-Wen Chang, Taichung County (TW)

(73) Assignee: Genius Electronic Optical Co., Ltd., Taichung County (TW)

( * ) Notice: Subject to any disclaimer, the term of this patent is extended or adjusted under 35 U.S.C. 154(b) by 288 days.

(21) Appl. No.: 12/974,808

(22) Filed: Dec. 21, 2010

(65) Prior Publication Data
US 2011/0157905 A1 Jun. 30, 2011

(30) Foreign Application Priority Data
Dec. 30, 2009 (TW) ................ 98145910 A (51) Int. Cl.
*F21V 5/00* (2006.01)
(52) U.S. Cl.
USPC ...... 362/326; 362/311.02; 362/335; 362/308; 362/309; 362/296.05
(58) Field of Classification Search
USPC ......... 362/517–522, 538, 475, 335, 308–309, 362/297, 299, 296.05, 326–327, 340, 311.02
See application file for complete search history.

(56) References Cited

U.S. PATENT DOCUMENTS

| 2,578,962 | A | | 12/1951 | Bergmans et al. | |
| 5,757,557 | A | * | 5/1998 | Medvedev et al. | 359/708 |
| 7,401,948 | B2 | * | 7/2008 | Chinniah et al. | 362/326 |
| 2003/0189835 | A1 | | 10/2003 | Tsukamoto | |
| 2010/0128233 | A1 | * | 5/2010 | Liu et al. | 353/98 |

FOREIGN PATENT DOCUMENTS

| CN | 101105272 A | 1/2008 |
| CN | 201281291 Y | 7/2009 |
| DE | 20 2009 004 929 U1 | 11/2009 |

* cited by examiner

*Primary Examiner* — Robert May
(74) *Attorney, Agent, or Firm* — Dickstein Shapiro LLP (57) ABSTRACT

A light guide lens includes a front light-exit surface, a rear end surface formed with a recess, and an outer surrounding surface. The front light-exit surface is a convex surface disposed at an optical axis (Z). The rear end surface includes a curved surface portion that defines an innermost end of the recess, and that is a convex surface. The rear end surface further includes an inner surrounding surface portion that extends rearward from a periphery of the curved surface portion. The outer surrounding surface diverges forwardly along the optical axis (Z), and includes a first curved surface part and a second curved surface part. The first and second curved surface parts are disposed on opposite sides of an imaginary plane on which the optical axis (Z) is disposed, and are asymmetrical relative to each other with respect to the imaginary plane.

17 Claims, 9 Drawing Sheets

LIGHT GUIDE LENS WITH CURVED SURFACE PARTS THAT REFLECT LIGHT INTO AN ASYMMETRICAL PATTERN, AND BICYCLE HEADLIGHT INCLUDING THE SAME

CROSS-REFERENCE TO RELATED APPLICATION

This application claims priority of Taiwanese Application No. 098145910, filed on Dec. 30, 2009.

BACKGROUND OF THE INVENTION

1. Field of the Invention

The present invention relates to a lens, more particularly to a light guide lens and a bicycle headlight including the light guide lens.

2. Description of the Related Art

Figure 1:
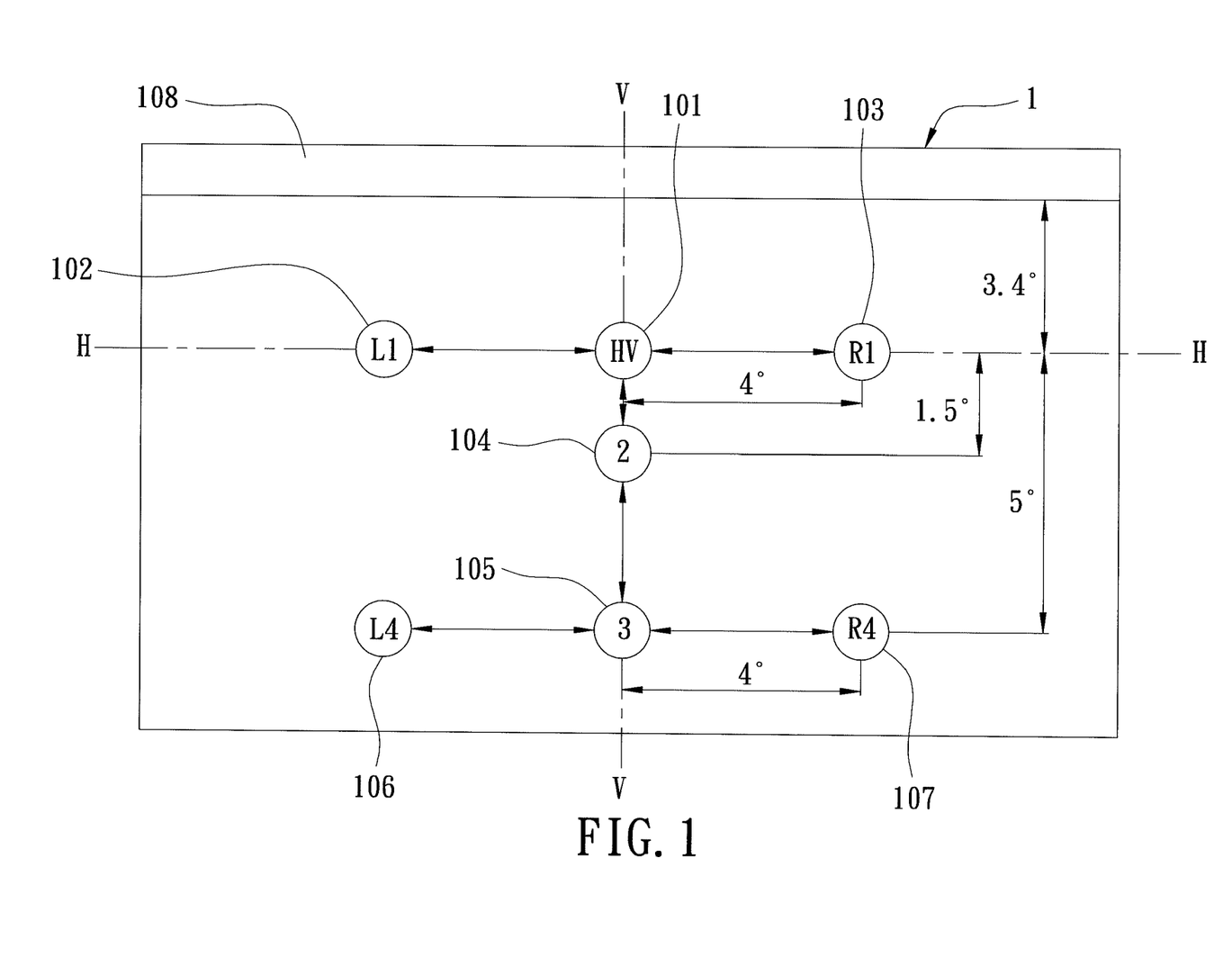
FIG. 1 is a schematic view of a test board that is for testing light output distribution, and that is adopted by the German traffic administration regulation act.

Conventional light guide lenses applied in bicycle headlights (for example, that discussed in U.S. Pat. No. 5,757,557) mostly adopt a symmetric light output design, in which the light guide lens includes an outer surrounding surface that is symmetrical with respect to an optical axis (Z). Thus, the light output of the light guide lens has a symmetric distribution relative to a reference plane transverse to the optical axis (Z). However, in consideration of light output efficiency and driving safety of oncoming vehicles, etc., many countries have issued traffic regulations in which the light output of bicycle headlights should comply with a specific distribution satisfying traffic safety. For example, referring to FIG. 1, a test board 1 for testing the light output distribution is adopted by the German traffic affair authority. The German traffic affair authority requires that light source luminance flux of a to-be-tested vehicle headlight should not exceed 42 lm (lumen). The test board 1 is at a distance of 10 meters from the to-be-tested vehicle headlight, and includes seven test points and one test zone. The test board 1 is explained in the following:

1. the test board 1 including a HV test point 101 which is an intersection of a horizontal line (H-H) and a vertical line (V-V), an imaginary line that interconnects the HV test point 101 and a center of the vehicle headlight being transverse to the test board 1, other test points being determined according to included angles between the imaginary line and a connecting line that interconnects the vehicle headlight and one of the test points on the horizontal line (H-H) or the vertical line (V-V);

2. if an illumination value tested at the HV test point 101 is a maximum value (i.e., a maximum illumination), a value of the maximum illumination being at least 10 lx (lux); if the maximum illumination is not tested at the HV test point 101, the value of the maximum illumination should not exceed 1.2 times the illumination value at the HV test point 101, 3. a L1 test point 102 being determined according to an included angle at 4° on a left side with respect to the HV test point 101, a R1 test point 103 being determined according to an included angle at 4° on a right side with respect to the HV test point 101, and a second test point 104 being determined according to an included angle at 1.5° below the HV test point 101, each of illumination values tested at a respective one of the three test points 102, 103, 104 being required to achieve 50% of the maximum illumination, 4. a third test point 105 being determined according to an included angle at 5° below the HV test point 101, an illumination value tested in an area between the second test point 104 and the third test point 105 being required to exceed 1.5 lx;

5. a L4 test point 106 being determined according to an included angle at 4° on a left side with respect to the third test point 105, a R4 test point 107 being determined according to an included angle at 4° on a right side with respect to the third test point 105, each of illumination values tested at a respective one of the two test points 106, 107 being required to exceed 1.0 lx; and 6. the test zone 108 being determined according to an included angle greater than 3.4° above the HV test point 101, an illumination value tested therein should not exceed 2.0 lx.

It is known from the aforementioned requirements of the German traffic affair authority that the light output of the to-be-tested vehicle headlight should have an asymmetric distribution exhibiting a brightest part in center, and gradually darker parts above and below the center relative to the test board 1. Thus, the conventional headlights with symmetric light output distribution are not capable of satisfying current requirements. Even though light reflective components may be adopted to adjust the light output distribution, light output efficiency would be adversely affected.

SUMMARY OF THE INVENTION

Therefore, an object of the present invention is to provide a light guide lens that is capable of generating an asymmetric distribution.

Another object of the present invention is to provide a bicycle headlight including a light guide lens that is capable of generating an asymmetric distribution.

Accordingly, the light guide lens of the present invention includes a front light-exit surface, a rear end surface, and an outer surrounding surface. The front light-exit surface is a convex surface disposed at an optical axis (Z). The rear end surface is formed with a recess. The rear end surface includes a curved surface portion that defines an innermost end of the recess, that is disposed at the optical axis (Z), and that is a convex surface. The rear end surface further includes an inner surrounding surface portion that extends rearward from a periphery of the curved surface portion. The outer surrounding surface extends between the front light-exit surface and the rear end surface. The outer surrounding surface diverges forwardly along the optical axis (Z), and includes a first curved surface part and a second curved surface part. The first curved surface part and the second curved surface part are disposed on opposite sides of an imaginary plane on which the optical axis (Z) is disposed, and are asymmetrical relative to each other with respect to the imaginary plane. A first portion of light refracted by the inner surrounding surface portion is reflected by the first curved surface part and is further refracted by the front light-exit surface to form a first light output, and a second portion of light refracted by the inner surrounding surface portion is reflected by the second curved surface part and is further refracted by the front light-exit surface to form a second light output. The first and second light outputs have an asymmetric distribution relative to a reference plane transverse to the optical axis (Z).

The bicycle headlight of the present invention includes a housing, a light guide lens, and a light source. The light guide lens is disposed in the housing, and includes a front light-exit surface, a rear end surface formed with a recess, and an outer surrounding surface extending between the front light-exit surface and the rear end surface. The front light-exit surface is a convex surface disposed at an optical axis (Z). The rear end surface includes a curved surface portion that defines an innermost end of the recess, that is disposed at the optical axis (Z), and that is a convex surface. The rear end surface further includes an inner surrounding surface portion that extends rearward from a periphery of the curved surface portion. The outer surrounding surface diverges forwardly along the optical axis (Z), and includes a first curved surface part and a second curved surface part. The first curved surface part and the second curved surface part are disposed on opposite sides of an imaginary plane on which the optical axis (Z) is disposed, and are asymmetrical relative to each other with respect to the imaginary plane. The light source is disposed in the housing and corresponds in position to the recess of the rear end surface of the light guide lens. The light source emits light rays toward the light guide lens. A first portion of light from the light source is refracted by the inner surrounding surface portion, is reflected by the first curved surface part, and is further refracted by the front light-exit surface to form a first light output. A second portion of light from the light source is refracted by the inner surrounding surface portion, is reflected by the second curved surface part, and is further refracted by the front light-exit surface to form a second light output. The first and second light outputs have an asymmetric distribution relative to a reference plane transverse to the optical axis (Z).

BRIEF DESCRIPTION OF THE DRAWINGS

Other features and advantages of the present invention will become apparent in the following detailed description of the four preferred embodiments with reference to the accompanying drawings, of which.

DETAILED DESCRIPTION OF THE PREFERRED EMBODIMENTS

Before the present invention is described in greater detail with reference to the preferred embodiments, it should be noted that the same reference numerals are used to denote the same elements throughout the following description.

Figure 2:
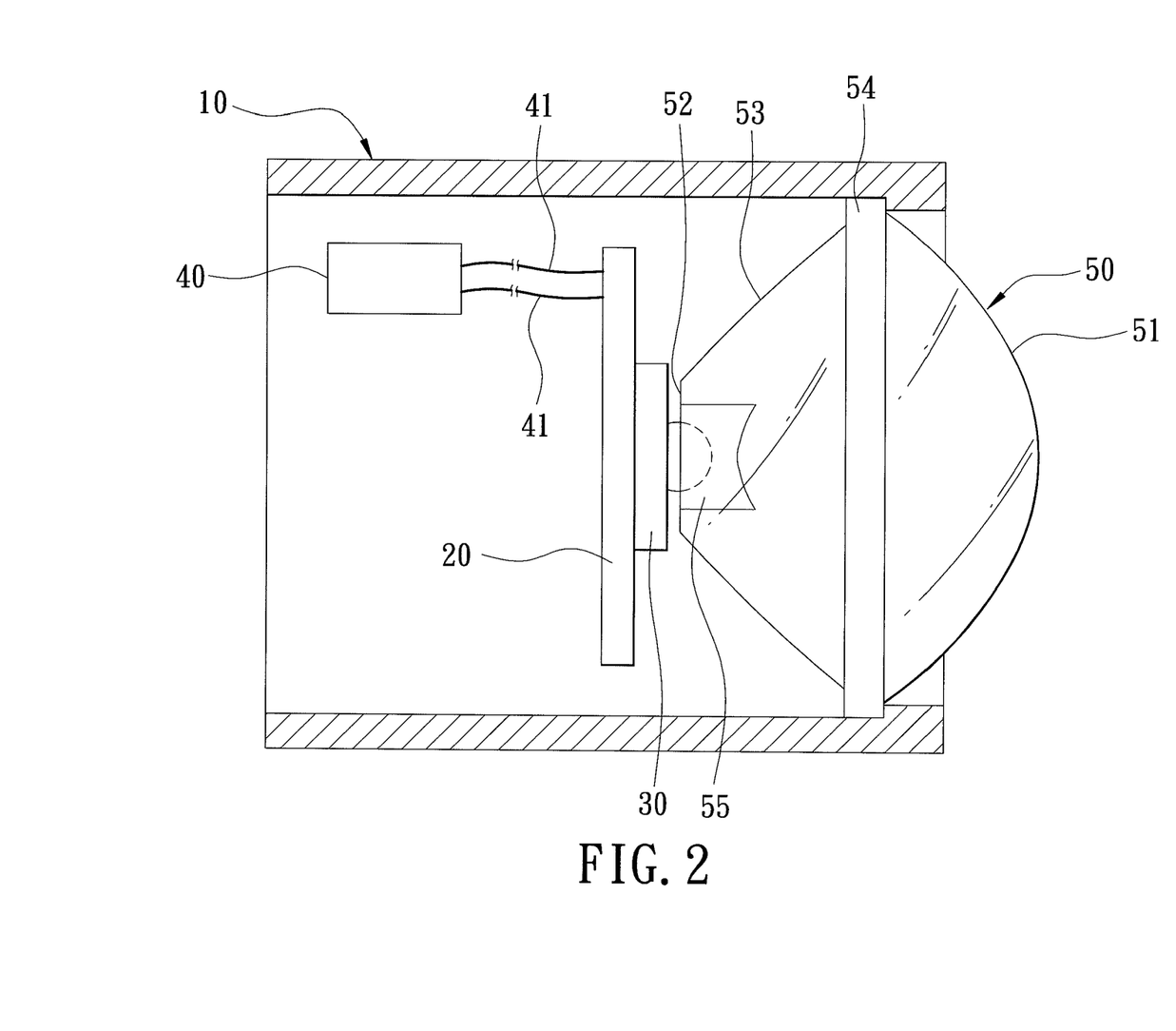
FIG. 2 is a schematic cross-sectional view illustrating a housing, a circuit board, a light source, a power source, and a first preferred embodiment of the light guide lens of the present invention.
Figure 3:
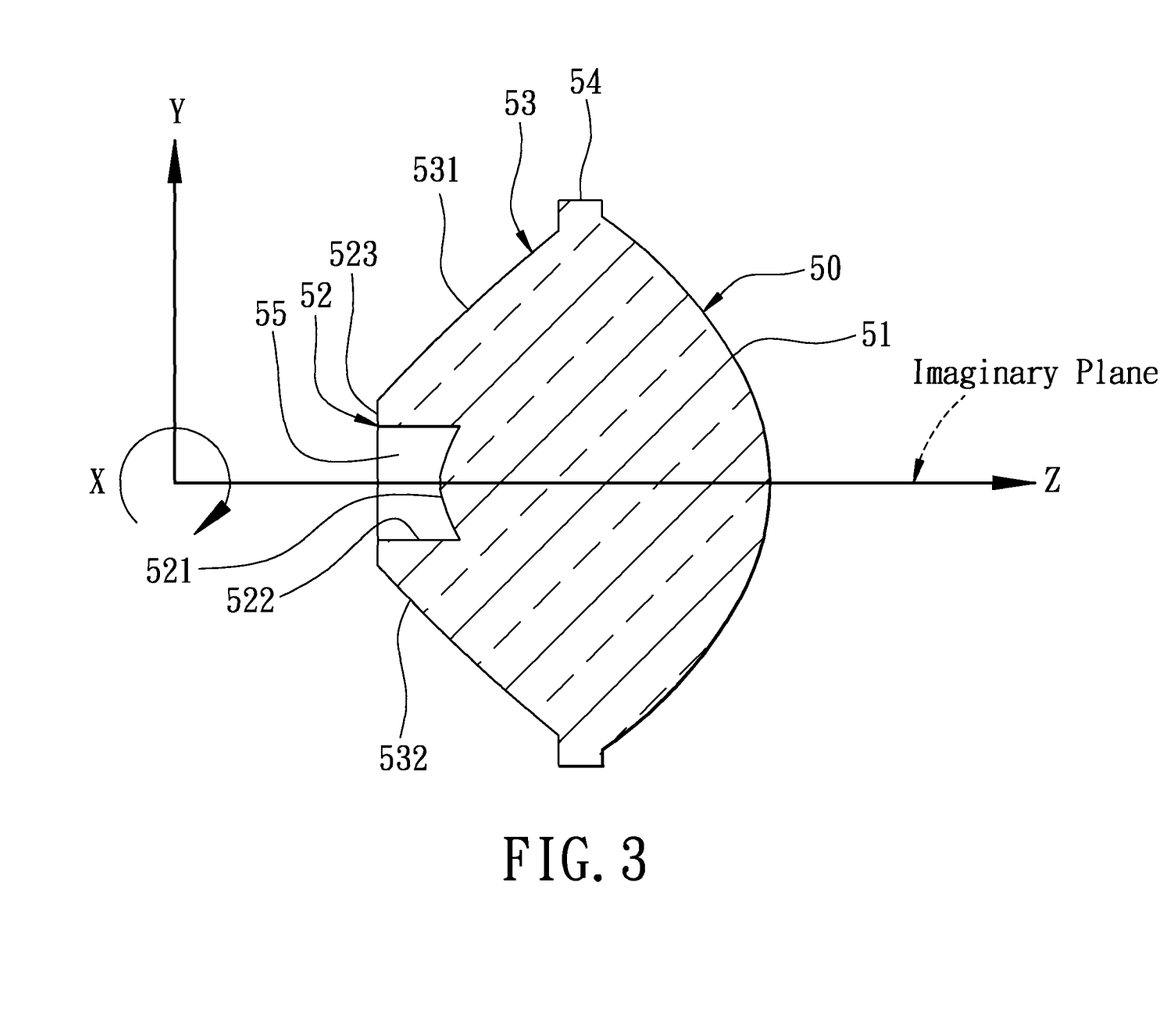
FIG. 3 is a schematic cross-sectional view illustrating the first preferred embodiment.

Referring to FIG. 2 and FIG. 3, a first preferred embodiment of the light guide lens 50 of the present invention is illustrated. The light guide lens 50 is assembled together with a housing 10, a circuit board 20, a light source 30, and a power source 40 to form a bicycle headlight.

The housing 10 defines a receiving space.

The circuit board 20 is disposed in the housing 10.

The light source 30 is disposed in the housing 10, and is operable to emit light rays toward the light guide lens 50. In this embodiment, the light source 30 is a LED light source disposed on and coupled electrically to the circuit board 20.

The power source 40 is disposed in the housing 10, and is coupled electrically to the circuit board 20 through a pair of conductive wires 41. In this embodiment, the power source 40 is a battery module.

The light guide lens 50 is disposed in the housing 10. The light guide lens 50 includes a front light-exit surface 51, a rear end surface 52 formed with a recess 55, an outer surrounding surface 53 extending between the front light-exit surface 51 and the rear end surface 52, and an annular flange 54 disposed between the front light-exit surface 51 and the outer surrounding surface 53. The light source 30 corresponds in position to the recess 55 of the rear end surface 52 of the light guide lens 50, and extends into the recess 55. While the annular flange 54 is capable of enhancing appearance of the light guide lens 50 when viewed from a front side of the light guide lens 50, the annular flange 54 may be omitted and the front light-exit surface 51 may be connected to the outer surrounding surface 53 directly for manufacturing considerations.

The front light-exit surface 51 is a convex surface disposed at an optical axis (Z).

The rear end surface 52 includes a curved surface portion 521 that defines an innermost end of the recess 55, that is disposed at the optical axis (Z), and that is a convex surface. The rear end surface 52 further includes an inner surrounding surface portion 522 that extends rearward from a periphery of the curved surface portion 521, and an annular planar portion 523 interconnecting the inner surrounding surface portion 522 and the outer surrounding surface 53.

The outer surrounding surface 53 diverges forwardly along the optical axis (Z), and includes a first curved surface part 531 and a second curved surface part 532. The first curved surface part 531 and the second curved surface part 532 are disposed on opposite sides of an imaginary plane on which the optical axis (Z) is disposed, and are asymmetrical relative to each other with respect to the imaginary plane. Moreover, the first curved surface part 531 and the second curved surface part 532 are interconnected at smooth and continuous junctions that are disposed at the imaginary plane.

Figure 4:
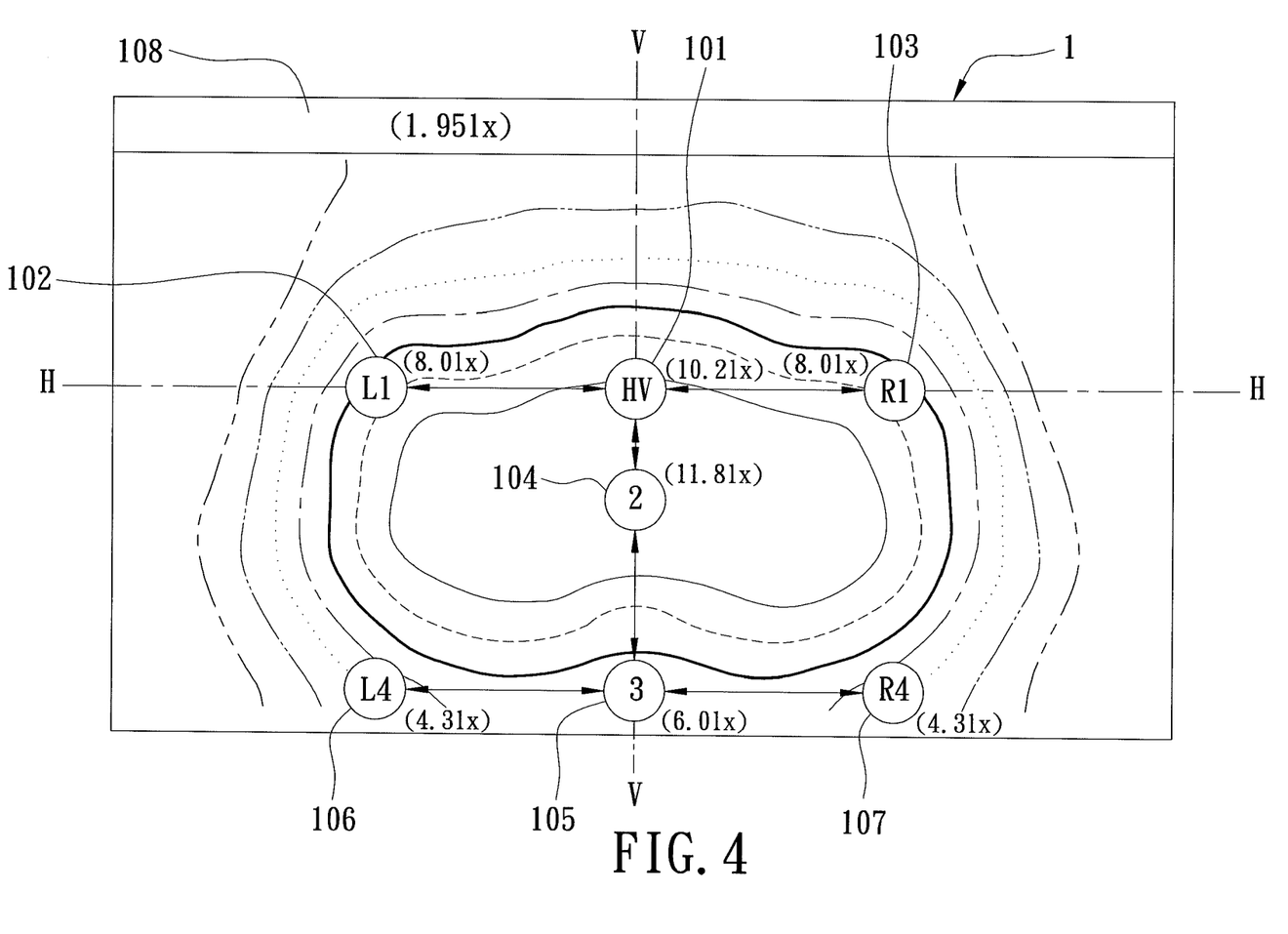
FIG. 4 is a contour map of a light output distribution of the first preferred embodiment on the test board of FIG. 1.

A first portion of light refracted by the inner surrounding surface portion 522 is reflected by the first curved surface part 531 and is further refracted by the front light-exit surface 51 to form a first light output, and a second portion of light refracted by the inner surrounding surface portion 522 is reflected by the second curved surface part 532 and is further refracted by the front light-exit surface 51 to form a second light output. The first and second light outputs have an asymmetric distribution relative to a reference plane transverse to the optical axis (Z), as best shown in FIG. 4.

In this embodiment, each of the front light-exit surface 51 and the curved surface portion 521 of the rear end surface 52 is symmetrical relative to the imaginary plane, and satisfies the following conic surface equation:

$$z - z_a = \frac{\frac{1}{r}R^2}{1 + \sqrt{1 - \frac{(1+k)}{r^2}R^2}},$$

in which z represents a z-component of a coordinate of a corresponding one of the front light-exit surface 51 and the curved surface portion 521 of the rear end surface 52 along the optical axis (Z), $z_a$ represents a reference point of a corresponding one of the front light-exit surface 51 and the curved surface portion 521 of the rear end surface 52 at the optical axis (Z), $$R=\sqrt{x^2+y^2},$$

x represents a x-component of a coordinate of a corresponding one of the front light-exit surface 51 and the curved surface portion 521 of the rear end surface 52 along a X-axis perpendicular to the optical axis (Z), y represents a y-component of a coordinate of a corresponding one of the front light-exit surface 51 and the curved surface portion 521 of the rear end surface 52 along a Y-axis perpendicular to the optical axis (Z) and the X-axis, r represents a radius of curvature of a corresponding one of the front light-exit surface 51 and the curved surface portion 521 of the rear end surface 52, and k represents a conic constant of a corresponding one of the front light-exit surface 51 and the curved surface portion 521 of the rear end surface 52.

In this embodiment, parameters in the aforementioned conic surface equation for the front light-exit surface 51 and the curved surface portion 521 of the rear end surface 52 are illustrated in Table 1:

TABLE 1

|  | $z_a$ | r | k |
|---|---|---|---|
| The front light-exit surface | 24.00 | −13.17 | −0.93 |
| The curved surface portion | 6.30 | 2.50 | −4.63 |

Furthermore, the radius of curvature $r_c$ of the front light-exit surface 51 and the radius of curvature $r_e$ of the curved surface portion 521 of the rear end surface 52 satisfies the following condition:

$$0.05 \leq \left(\frac{1}{r_e} - \frac{1}{r_c}\right) \leq 1$$

In this embodiment, $$\frac{1}{r_e} - \frac{1}{r_c} = 0.479$$

Moreover, the conic constant k of the curved surface portion 521 of the rear end surface 52 ranges from 2 to −5.

Specifically, opening angles of light rays are small because the light rays emitted from the bicycle headlight need to be projected to a far distance. Generally, the front light-exit surface 51 and the curved surface portion 521 of the rear end surface 52 may achieve acceptable efficiency by only eliminating spherical aberration thereof in design. In optical design, the conic constant k is usually adjusted for eliminating spherical aberration. Moreover, since only a center part of the front light-exit surface 51 is used for light guiding, spherical aberration observed in the front light-exit surface 51 is not apparent. Spherical aberration of the light guide lens 50 is mainly influenced by the curved surface portion 521 of the rear end surface 52. Therefore, the conic constant k of the curved surface portion 521 of the rear end surface 52 ranges from 2 to −5.

More importantly, in this embodiment, each of the first and second curved surface parts 531, 532 of the outer surrounding surface 53 satisfies the following biconic surface equation:

$$z - z_0 = \frac{\frac{1}{r_x}x^2 + \frac{1}{r_y}y^2}{1+\sqrt{1-\frac{(1+k_x)}{r_x^2}x^2 - \frac{(1+k_y)}{r_y^2}y^2}},$$

in which x represents a x-component of a coordinate of the outer surrounding surface 53 along the X-axis, y represents a y-component of a coordinate of the outer surrounding surface 53 along the Y-axis, z represents a z-component of a coordinate of the outer surrounding surface 53 along the optical axis (Z), $z_0$ represents a reference point of the outer surrounding surface 53 at the optical axis (Z), $r_x$ represents a radius of curvature of the outer surrounding surface 53 at the X-axis, $k_x$ represents a conic constant of the outer surrounding surface 53 at the X-axis, $r_y$ represents a radius of curvature of the outer surrounding surface 53 at the Y-axis, and $k_y$ represents a conic constant of the outer surrounding surface 53 at the Y-axis.

For satisfying that the first and second curved surface parts 531, 532 are interconnected at the smooth and continuous junctions that are disposed at the imaginary plane (i.e., Z-X plane in FIG. 3), the first and second curved surface parts 531, 532 further satisfy conditions of: $r_x$ of the first and second curved surface parts 531, 532 are the same; $k_x$ of the first and second curved surface parts 531, 532 are the same; and at least one of $r_y$ and $k_y$ of the first curved surface part 531 is different from those of the second curved surface part 532.

In this embodiment, parameters of the first and second curved surface part 531, 532 are illustrated in Table 2.

TABLE 2

|  | $z_0$ | $r_x$ | $k_x$ | $r_y$ | $k_y$ |
|---|---|---|---|---|---|
| The first curved surface part | 0.65 | 4.34 | −1.56 | 4.61 | −1.54 |
| The second curved surface part | 0.65 | 4.34 | −1.56 | 5.50 | −1.65 |

In this way, referring to FIG. 4, the first portion of light refracted by the inner surrounding surface portion 522 is reflected by the first curved surface part 531 and is further refracted by the front light-exit surface 51 to form the first light output, and the second portion of light refracted by the inner surrounding surface portion 522 is reflected by the second curved surface part 532 and is further refracted by the front light-exit surface 51 to form the second light output. The first and second light outputs have an asymmetric distribution relative to a test board 1 transverse to the optical axis (Z). It is known from experiments that an illumination value tested at HV test point 101 is 10.2 lx, that illumination values tested at L1, R1 tests points 102, 103 are 8.0 lx, that an illumination value tested at a second test point 104 is 11.8 lx, that an illumination value tested at a third test point 105 is 6.0 lx, that illumination values tested at L4, R4 test points 106, 107 are 4.3 lx, and that an illumination value tested in test zone 108 is 1.95 lx.

Apparently, the present invention is capable of generating the asymmetric distribution exhibiting a brightest part in the center, and gradually darker parts above and below the center relative to the test board 1 transverse to the optical axis (Z) so as to comply with the German traffic administration regulation act.

Figure 5:
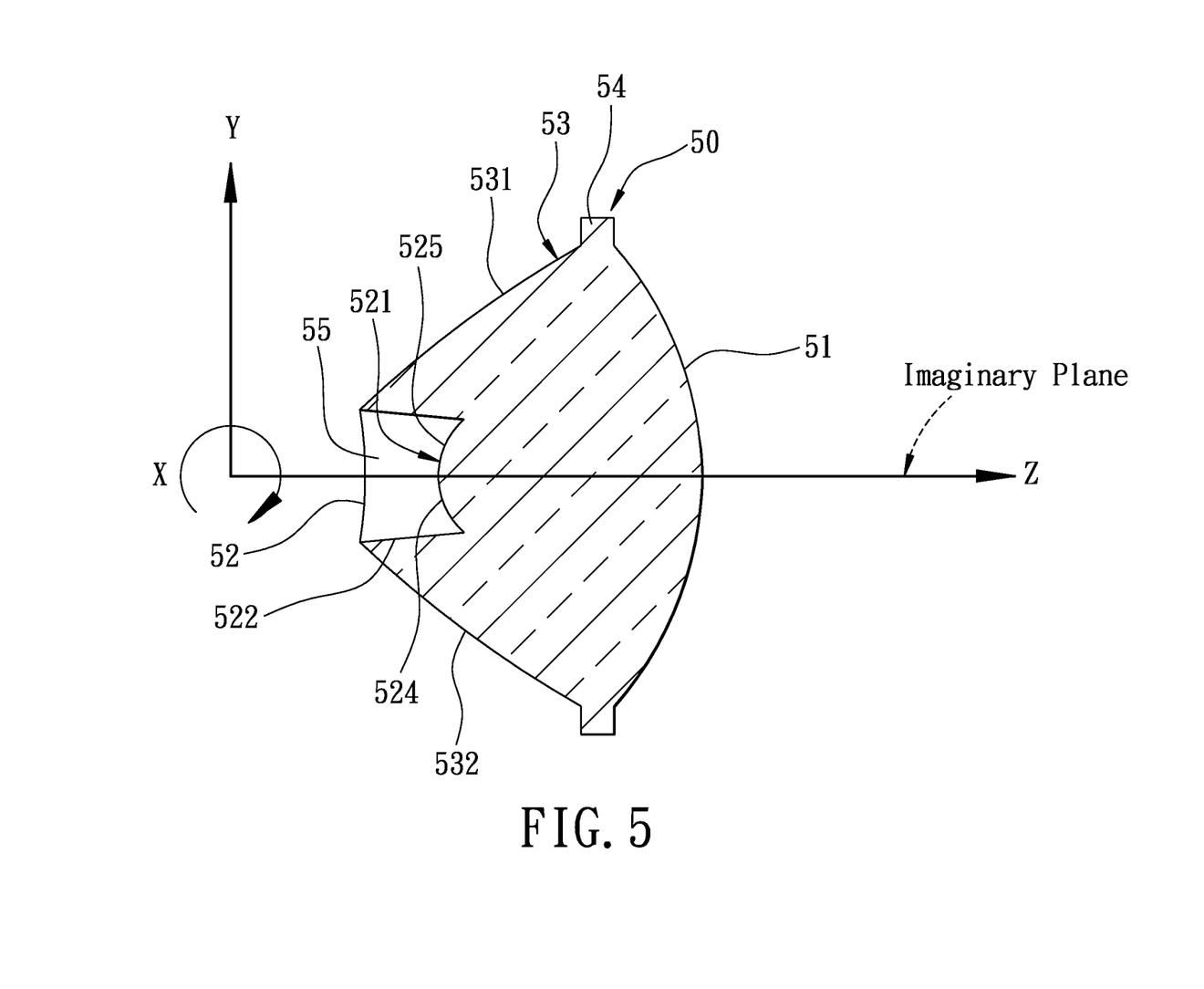
FIG. 5 is a schematic cross-sectional view of a second preferred embodiment of the light guide lens of the present invention.

Referring to FIG. 5, a second preferred embodiment similar to the first preferred embodiment is illustrated. The differences between the second preferred embodiment and the first preferred embodiment reside in that:

the curved surface potion 521 of the rear end surface 52 includes a third curved surface part 525 and a fourth curved surface part 524. The third curved surface part 525 and the fourth curved surface part 524 are interconnected at smooth and continuous junctions that are disposed at the imaginary plane (i.e., the Z-X plane in FIG. 5). The curved surface portion 521 of the rear end surface 52 satisfies the following biconic surface equation:

$$z - z_b = \frac{\frac{1}{r_v}x^2 + \frac{1}{r_w}y^2}{1 + \sqrt{1 - \frac{(1+k_v)}{r_v^2}x^2 - \frac{(1+k_w)}{r_w^2}y^2}},$$

in which x represents a x-component of a coordinate of the curved surface portion 521 of the rear end surface 52 along the X-axis, y represents a y-component of a coordinate of the curved surface portion 521 of the rear end surface 25 along a Y-axis, z represents a z-component of a coordinate of the curved surface portion 521 of the rear end surface 52 along the optical axis (Z), $z_b$ represents a reference point of the curved surface portion 521 of the rear end surface 52 at the optical axis (Z), $r_v$ represents a radius of curvature of the curved surface portion 521 of the rear end surface 52 at the X-axis, $k_v$ represents a conic constant of the curved surface portion 521 of the rear end surface 52 at the X-axis, $r_w$ represents a radius of curvature of the curved surface portion 521 of the rear end surface 52 at the Y-axis, and $k_w$ represents a conic constant of the curved surface portion 521 of the rear end surface 52 at the Y-axis.

In this embodiment, the third and fourth curved surface parts 525, 524 are distinguishable along the Y-axis. Referring to FIG. 5, a part of the curved surface portion 521 of the rear end surface 52 that corresponds to a positive segment along the Y-axis is the third curved surface part 525. On the other hand, another part of the curved surface portion 521 of the rear end surface 52 that corresponds to a negative segment along the Y-axis is the fourth curved surface part 524.

Furthermore, for satisfying that the third and fourth curved surface parts 525, 524 are interconnected at the smooth and continuous junctions that are disposed at the imaginary plane, the third and fourth curved surface parts 525, 524 further satisfy conditions of: $r_v$ of the third and fourth curved surface parts 525, 524 are the same; $k_v$ of the third and fourth curved surface parts 525, 524 are the same; and at least one of $r_w$ and $k_w$ of the third curved surface part 525 is different from those of the fourth curved surface part 524.

In this embodiment, parameters of the front light-exit surface 51 are illustrated in Table 3.

TABLE 3

|  | $z_a$ | r | k |
|---|---|---|---|
| The front light-exit surface | 26.79 | −27.60 | −1.20 |

Moreover, parameters of the first and second curved surface parts 531, 532 of the outer surrounding surface 53, and the third and fourth curved surface parts 525, 524 of the curved surface portion 521 of the rear end surface 52 are illustrated in Table 4.

TABLE 4

|  | $z_0$ | $r_x$ | $k_x$ | $r_y$ | $k_y$ |
|---|---|---|---|---|---|
| The first curved surface part | 0.70 | 4.60 | −1.39 | 5.35 | −1.37 |
| The second curved surface part | 0.70 | 4.60 | −1.39 | 5.79 | −1.45 |

|  | $z_b$ | $r_v$ | $k_v$ | $r_w$ | $k_w$ |
|---|---|---|---|---|---|
| The third curved surface part | 6.89 | 13.18 | 0 | 8.17 | 1.30 |
| The fourth curved surface part | 6.89 | 13.18 | 0 | 8.02 | −1.48 |

Figure 6:
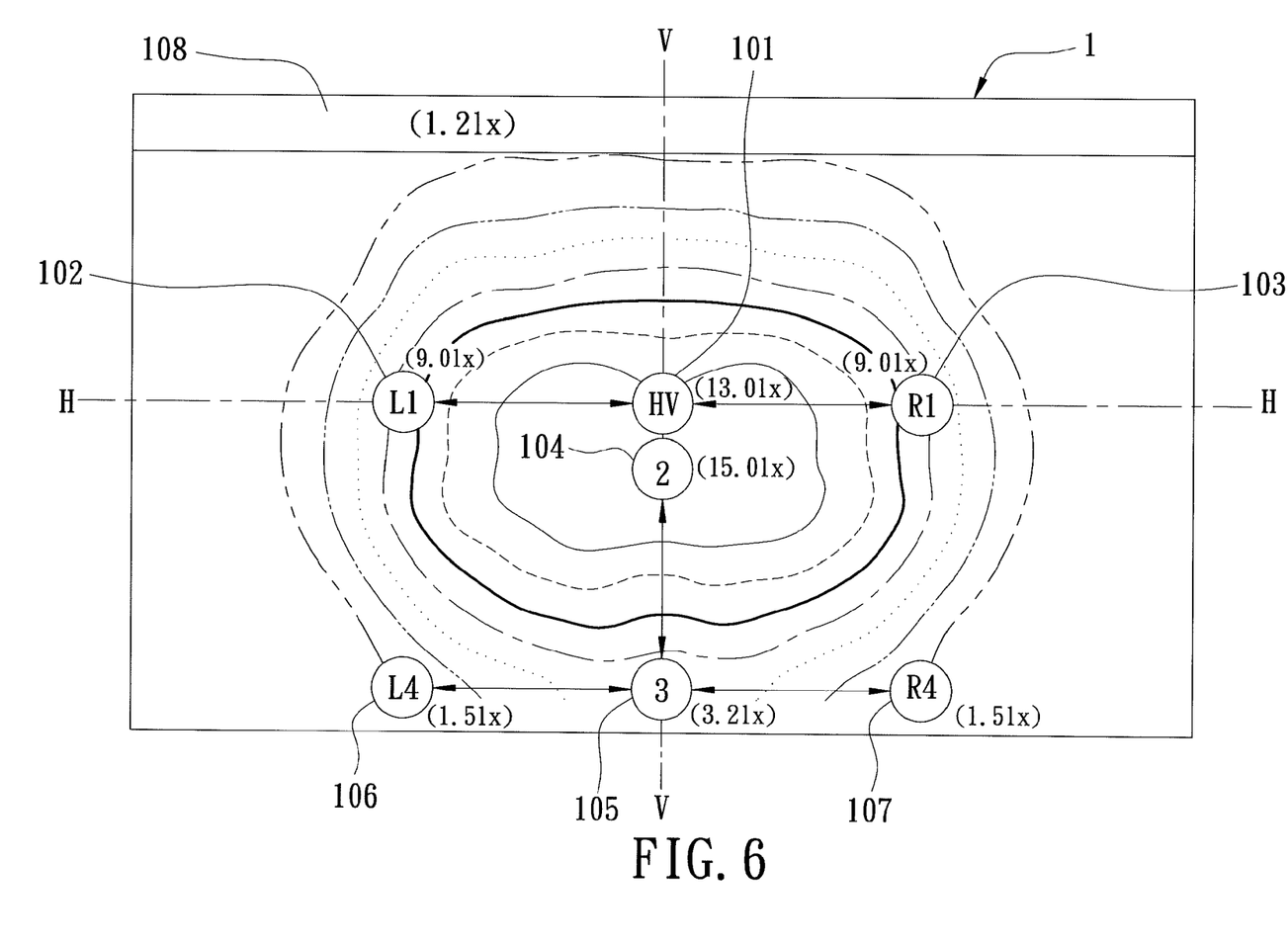
FIG. 6 is a contour map of a light output distribution of the second preferred embodiment on the test board of FIG. 1.

Referring to FIG. 6, it is known from experiments that an illumination value tested at the HV test point 101 is 13.0 lx, that illumination values tested at the L1, R1 tests points 102, 103 are 9.0 lx, that an illumination value tested at the second test point 104 is 15.0 lx, that an illumination value tested at the third test point 105 is 3.2 lx, that illumination values tested at the L4, R4 test points 106, 107 are 1.5 lx, and that an illumination value tested in the test zone 108 is 1.2 lx.

Figure 7:
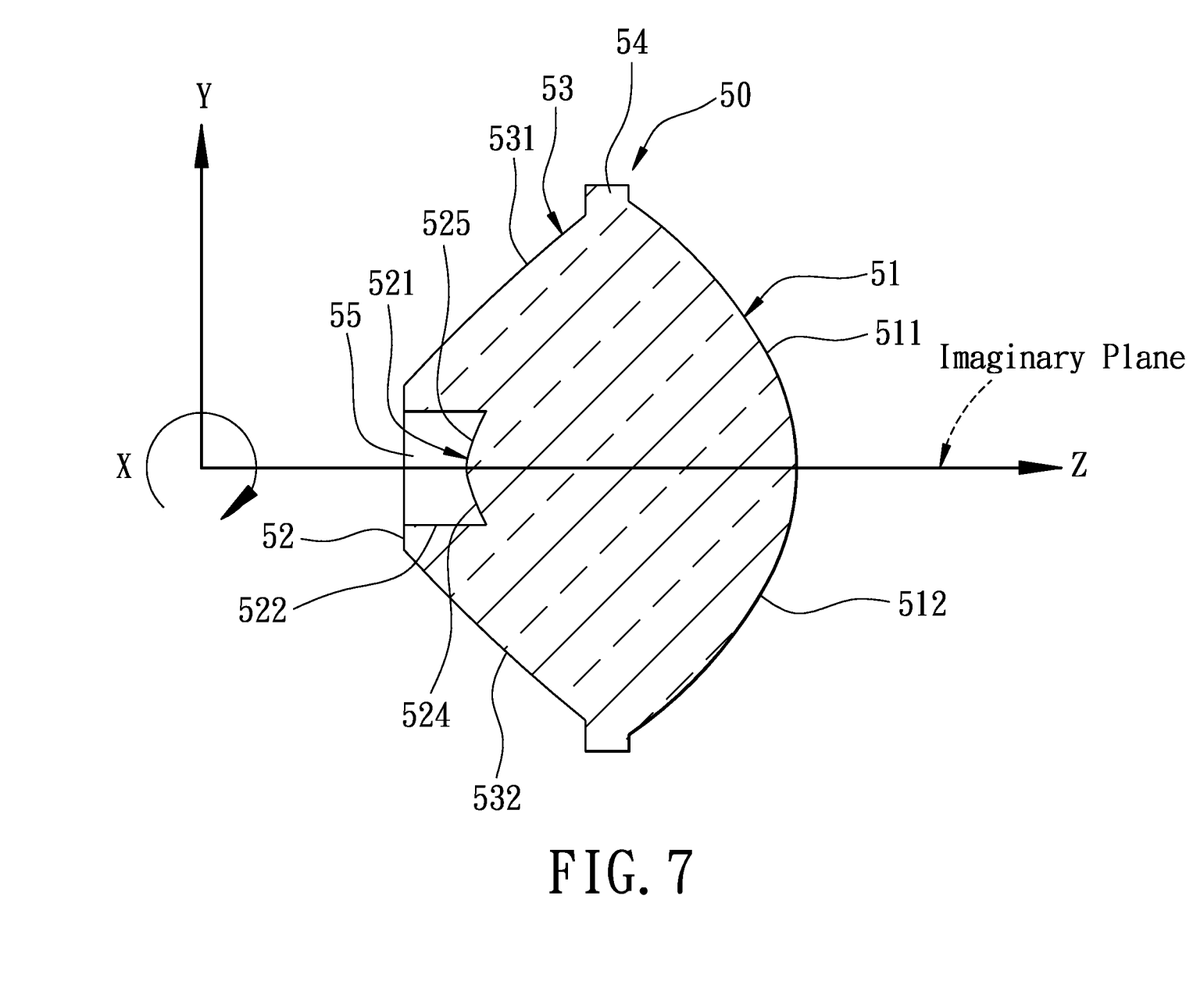
FIG. 7 is a schematic cross-sectional view of a third preferred embodiment of the light guide lens of the present invention.

Referring to FIG. 7, a third preferred embodiment similar to the second preferred embodiment is illustrated. The differences between the third preferred embodiment and the second preferred embodiment reside in that:

the front light-exit surface 51 includes a fifth curved surface part 511 and a sixth curved surface part 512. The fifth curved surface part 511 and the sixth curved surface part 512 are interconnected at smooth and continuous junctions that are disposed at the imaginary plane (i.e., the Z-X plane in FIG. 7). The front light-exit surface 51 satisfies the following biconic surface equation:

$$z - z_c = \frac{\frac{1}{r_s}x^2 + \frac{1}{r_t}y^2}{1 + \sqrt{1 - \frac{(1+k_s)}{r_s^2}x^2 - \frac{(1+k_t)}{r_t^2}y^2}},$$

in which x represents a x-component of a coordinate of the front light-exit surface 51 along a X-axis, y represents a y-component of a coordinate of the front light-exit surface 51 along the Y-axis, z represents a z-component of a coordinate of the front light-exit surface 51 along the optical axis (Z), $z_c$ represents a reference point of the front light-exit surface 51 at the optical axis (Z), $r_s$ represents a radius of curvature of the front light-exit surface 51 at the X-axis, $k_s$ represents a conic constant of the front light-exit surface 51 at the X-axis, $r_t$ represents a radius of curvature of the front light-exit surface 51 at the Y-axis, and $k_t$ represents a conic constant of the front light-exit surface 51 at the Y-axis.

In this embodiment, the fifth and sixth curved surface part 511, 512 are distinguishable along the Y-axis. Referring to FIG. 7, a part of the front light-exit surface 51 that corresponds to a positive segment along the Y-axis is the fifth curved surface part 511. On the other hand, another part of the front light-exit surface 51 that corresponds to a negative segment along the Y-axis is the sixth curved surface part 512.

Furthermore, for satisfying that the fifth and sixth curved surface parts 511, 512 are interconnected at the smooth and continuous junctions that are disposed at the imaginary plane, the fifth and sixth curved surface parts 511, 512 further satisfy conditions of: $r_s$ of the fifth and sixth curved surface parts 511, 512 are the same; $k_s$ of the fifth and sixth curved surface parts 511, 512 are the same; and at least one of $r_t$ and $k_t$ of the fifth curved surface part 511 is different from those of the sixth curved surface part 512.

In this embodiment, parameters of the first and second curved surface parts 531, 532 of the outer surrounding surface 53, the third and fourth curved surface parts 525, 524 of the curved surface portion 521 of the rear end surface 52, and the fifth and sixth curved surface parts 511, 512 of the front light-exit surface 51 are illustrated in Table 5.

TABLE 5

|  | $z_0$ | $r_x$ | $k_x$ | $r_y$ | $k_y$ |
|---|---|---|---|---|---|
| The first curved surface part | 0 | 4.35 | −1.40 | 5.35 | −1.36 |
| The second curved surface part | 0 | 4.35 | −1.40 | 5.73 | −1.41 |

|  | $z_b$ | $r_v$ | $k_v$ | $r_w$ | $k_w$ |
|---|---|---|---|---|---|
| The third curved surface part | 10.28 | 6.50 | −1.60 | 5.90 | −2.30 |
| The fourth curved surface part | 10.28 | 6.50 | −1.60 | 8.00 | −1.75 |

|  | $z_c$ | $r_s$ | $k_s$ | $r_t$ | $k_t$ |
|---|---|---|---|---|---|
| The fifth curved surface part | 34.70 | −27.16 | −1.198 | −29.06 | −0.93 |
| The sixth curved surface part | 34.70 | −27.16 | −1.198 | −25.62 | −0.95 |

Figure 8:
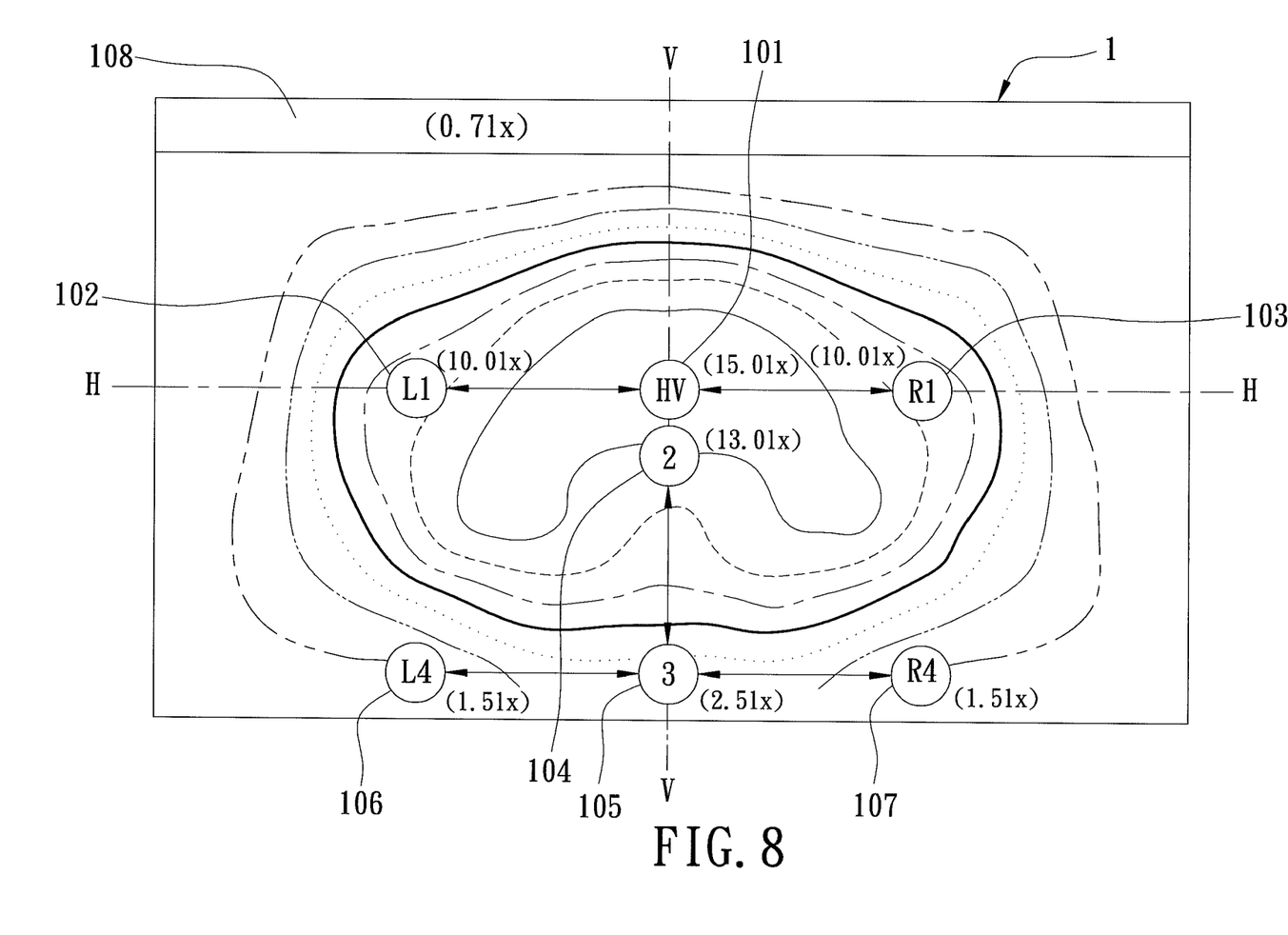
FIG. 8 is a contour map of a light output distribution of the third preferred embodiment on the test board of FIG. 1.

Referring to FIG. 8, it is known from experiments that an illumination value tested at the HV test points 101 is 15.0 lx, that illumination values tested at the L1, R1 tests points 102, 103 are 10.0 lx, that an illumination value tested at the second test point 104 is 13.0 lx, that an illumination value tested at the third test point 105 is 2.5 lx, that illumination values tested at the L4, R4 test points 106, 107 are 1.5 lx, and that an illumination value tested in the test zone 108 is 0.7 lx.

Furthermore, by comparing FIG. 4, FIG. 6 and FIG. 8 that respectively correspond to the first, second and third preferred embodiments, it may be deduced that a contour map of the light output distribution of the present invention becomes more convergent and centralized with an increase in numbers of asymmetric curved surface parts from two to six. Meanwhile, the illumination value tested at the HV test point 101 is effectively increased, whereas the illumination value tested in the test zone 108 is effectively decreased for achieving better light shaping effect.

Figure 9:
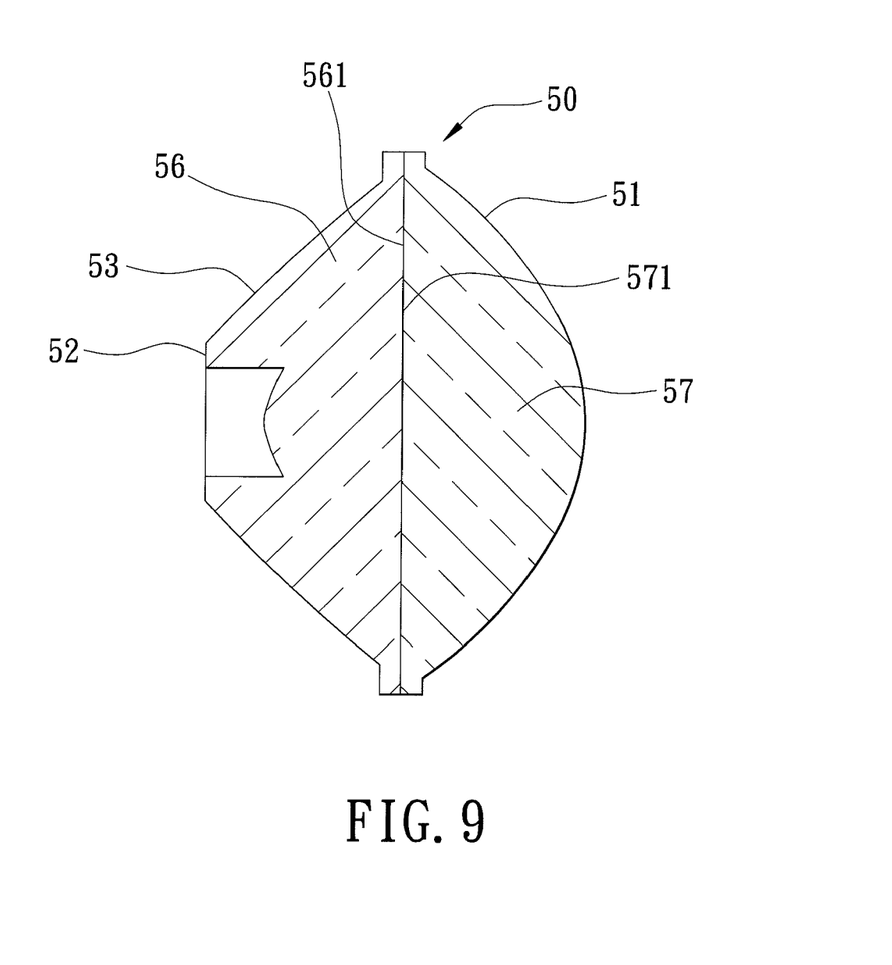
FIG. 9 is a schematic cross-sectional view of a fourth preferred embodiment of the light guide lens of the present invention.

Referring to FIG. 9, a fourth preferred embodiment similar to the first preferred embodiment is illustrated. The differences between the fourth preferred embodiment and the third preferred embodiment reside in that:

the light guide lens 50 of the present embodiment further includes a first lens body 56 and a second lens body 57 fixed to the first lens body 56 so as to form the light guide lens 50.

The first lens body 56 has a front joint face 561, and the second lens body 57 has a rear joint face 571 fixed to the front joint face 561. The rear end surface 52 is formed on the first lens body 56, and the outer surrounding surface 53 is disposed between the rear end surface 52 and the front joint face 561.

Moreover, the front light-exit surface 51 is formed on the second lens body 57 and protrudes forwardly from a periphery of the rear joint face 571.

In summary, the light output of the light guide lens 50 of the present invention may exhibit an asymmetric distribution by adopting designs of the asymmetric curved surface parts. Therefore, the present invention may comply with regulations in many countries that bicycle headlights need to generate an asymmetric light output distribution. Furthermore, conventional light reflective components for adjusting the light output distribution are omitted in the present invention. Accordingly, the present invention has relatively better light output efficiency and incurs lower costs.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A light guide lens comprising:
   a front light-exit surface being a convex surface disposed at an optical axis (Z);
   a rear end surface formed with a recess, said rear end surface including a curved surface portion that defines an innermost end of said recess, that is disposed at the optical axis (Z), and that is a convex surface, said rear end surface further including an inner surrounding surface portion that extends rearward from a periphery of said curved surface portion; and
   an outer surrounding surface extending between said front light-exit surface and said rear end surface, said outer surrounding surface diverging forwardly along the optical axis (Z), and including a first curved surface part and a second curved surface part, said first curved surface part and said second curved surface part being disposed on opposite sides of an imaginary plane on which the optical axis (Z) is disposed and being asymmetrical relative to each other with respect to the imaginary plane;
   wherein a first portion of light refracted by said inner surrounding surface portion is reflected by said first curved surface part and is further refracted by said front light-exit surface to form a first light output, and a second portion of light refracted by said inner surrounding surface portion is reflected by said second curved surface part and is further refracted by said front light-exit surface to form a second light output;
   wherein the first and second light outputs have an asymmetric distribution relative to a reference plane transverse to the optical axis (Z).

2. The light guide lens as claimed in claim 1, wherein said first curved surface part and said second curved surface part are interconnected at smooth and continuous junctions that are disposed at the imaginary plane.

3. The light guide lens as claimed in claim 2, wherein said inner surrounding surface portion diverges rearwardly along the optical axis (Z).

4. The light guide lens as claimed in claim 3, further comprising an annular flange disposed between said front light-exit surface and said outer surrounding surface.

5. The light guide lens as claimed in claim 3, wherein said curved surface portion of said rear end surface includes a third curved surface part and a fourth curved surface part that are disposed on opposite sides of the imaginary plane and that are asymmetrical relative to each other with respect to the imaginary plane.

6. The light guide lens as claimed in claim 3, wherein said front light-exit surface includes a fifth curved surface part and a sixth curved surface part that are disposed on opposite sides of the imaginary plane and that are asymmetrical relative to each other with respect to the imaginary plane.

7. The light guide lens as claimed in claim 3, further comprising a first lens body and a second lens body, said first lens body having a front joint face, said second lens body having a rear joint face fixed to said front joint face, said rear end surface being formed on said first lens body, said outer surrounding surface being disposed between said rear end surface and said front joint face, said front light-exit surface being formed on said second lens body.

8. The light guide lens as claimed in claim 1, wherein said outer surrounding surface satisfies the following biconic surface equation:

$$z - z_0 = \frac{\frac{1}{r_x}x^2 + \frac{1}{r_y}y^2}{1 + \sqrt{1 - \frac{(1+k_x)}{r_x^2}x^2 - \frac{(1+k_y)}{r_y^2}y^2}},$$

in which x represents a x-component of a coordinate of said outer surrounding surface along a X-axis perpendicular to the optical axis (Z), y represents a y-component of a coordinate of said outer surrounding surface along a Y-axis perpendicular to the optical axis (Z) and the X-axis, z represents a z-component of a coordinate of said outer surrounding surface along the optical axis (Z), $z_0$ represents a reference point of said outer surrounding surface at the optical axis (Z), $r_x$ represents a radius of curvature of said outer surrounding surface at the X-axis, $k_x$ represents a conic constant of said outer surrounding surface at the X-axis, $r_y$ represents a radius of curvature of said outer surrounding surface at the Y-axis, and $k_y$ represents a conic constant of said outer surrounding surface at the Y-axis; and wherein said outer surrounding surface further satisfies conditions of: $r_x$ of said first and second curved surface parts are the same; $k_x$ of said first and second curved surface parts are the same; and at least one of $r_y$ and $k_y$ of said first curved surface part is different from those of said second curved surface part.

9. The light guide lens as claimed in claim 8, wherein each of said front light-exit surface and said curved surface portion of said rear end surface is symmetrical relative to the imaginary plane, and satisfies the following conic surface equation:

$$z - z_a = \frac{\frac{1}{r}R^2}{1 + \sqrt{1 - \frac{(1+k)}{r^2}R^2}},$$

in which z represents a z-component of a coordinate of a corresponding one of said front light-exit surface and said curved surface portion of said rear end surface along the optical axis (Z), $z_a$ represents a reference point of a corresponding one of said front light-exit surface and said curved surface portion of said rear end surface at the optical axis (Z), $R = \sqrt{x^2 + y^2}$, x represents a x-component of a coordinate of a corresponding one of said front light-exit surface and said curved surface portion of said rear end surface along the X-axis, y represents a y-component of a coordinate of a corresponding one of said front light-exit surface and said curved surface portion of said rear end surface along the Y-axis, r represents a radius of curvature of a corresponding one of said front light-exit surface and said curved surface portion of said rear end surface, and k represents a conic constant of a corresponding one of said front light-exit surface and said curved surface portion of said rear end surface.

10. The light guide lens as claimed in claim 9, wherein the radius of curvature $r_c$ of said front light-exit surface and the radius of curvature $r_e$ of said curved surface portion of said rear end surface satisfies the following condition:

$$0.05 \leq \left(\frac{1}{r_e} - \frac{1}{r_c}\right) \leq 1$$

11. The light guide lens as claimed in claim 10, wherein the conic constant k of said curved surface portion of said rear end surface ranges from 2 to −5.

12. The light guide lens as claimed in claim 8, wherein said curved surface portion of said rear end surface includes a third curved surface part and a fourth curved surface part that are disposed on opposite sides of the imaginary plane and that are asymmetrical relative to each other with respect to the imaginary plane.

13. The light guide lens as claimed in claim 12, wherein said curved surface portion of said rear end surface satisfies the following biconic surface equation:

$$z - z_b = \frac{\frac{1}{r_v}x^2 + \frac{1}{r_w}y^2}{1 + \sqrt{1 - \frac{(1+k_v)}{r_v^2}x^2 - \frac{(1+k_w)}{r_w^2}y^2}},$$

in which x represents a x-component of a coordinate of said curved surface portion of said rear end surface along a X-axis perpendicular to the optical axis (Z), y represents a y-component of a coordinate of said curved surface portion of said rear end surface along a Y-axis perpendicular to the optical axis (Z) and the X-axis, z represents a z-component of a coordinate of said curved surface portion of said rear end surface along the optical axis (Z), $z_b$ represents a reference point of said curved surface portion of said rear end surface at the optical axis (Z), $r_v$ represents a radius of curvature of said curved surface portion of said rear end surface at the X-axis, $k_v$ represents a conic constant of said curved surface portion of said rear end surface at the X-axis, $r_w$ represents a radius of curvature of said curved surface portion of said rear end surface at the Y-axis, and $k_w$ represents a conic constant of said curved surface portion of said rear end surface at the Y-axis; and wherein said curved surface portion of said rear end surface further satisfies conditions of: $r_v$ of said third and fourth curved surface parts are the same; $k_v$ of said third and fourth curved surface parts are the same; and at least one of $r_w$ and $k_w$ of said third curved surface part is different from those of said fourth curved surface part.

14. The light guide lens as claimed in claim 8, wherein said front light-exit surface includes a fifth curved surface part and a sixth curved surface part that are disposed on opposite sides of the imaginary plane and that are asymmetrical relative to each other with respect to the imaginary plane.

15. The light guide lens as claimed in claim 14, wherein said front light-exit surface satisfies the following biconic surface equation:

$$z - z_c = \frac{\frac{1}{r_s}x^2 + \frac{1}{r_t}y^2}{1 + \sqrt{1 - \frac{(1+k_s)}{r_s^2}x^2 - \frac{(1+k_t)}{r_t^2}y^2}},$$

in which x represents a x-component of a coordinate of said front light-exit surface along a X-axis perpendicular to the optical axis (Z), y represents a y-component of a coordinate of said front light-exit surface along a Y-axis perpendicular to the optical axis (Z) and the X-axis, z represents a z-component of a coordinate of said front light-exit surface along the optical axis (Z), $z_c$ represents a reference point of said front light-exit surface at the optical axis (Z), $r_s$, represents a radius of curvature of said front light-exit surface at the X-axis, $k_s$ represents a conic constant of said front light-exit surface at the X-axis, $r_t$ represents a radius of curvature of said front light-exit surface at the Y-axis; and $k_t$ represents a conic constant of said front light-exit surface at the Y-axis, and wherein said front light-exit surface further satisfies conditions of: $r_s$ of said fifth and sixth curved surface parts are the same; $k_s$ of said fifth and sixth curved surface parts are the same; and at least one of $r_t$ and $k_t$ of said fifth curved surface part is different from those of said sixth curved surface part.

16. A bicycle headlight comprising:

a housing;

a light guide lens disposed in said housing, said light guide lens including a front light-exit surface, a rear end surface formed with a recess, and an outer surrounding surface extending between said front light-exit surface and said rear end surface, said front light-exit surface being a convex surface disposed at an optical axis (Z), said rear end surface including a curved surface portion that defines an innermost end of said recess, that is disposed at the optical axis (Z), and that is a convex surface, said rear end surface further including an inner surrounding surface portion that extends rearward from a periphery of said curved surface portion, said outer surrounding surface diverging forwardly along the optical axis (Z), and including a first curved surface part and a second curved surface part, said first curved surface part and said second curved surface part being disposed on opposite sides of an imaginary plane on which the optical axis (Z) is disposed and being asymmetrical relative to each other with respect to the imaginary plane; and a light source disposed in said housing and corresponding in position to said recess of said rear end surface of said light guide lens, said light source emitting light rays toward said light guide lens;

wherein a first portion of light from said light source is refracted by said inner surrounding surface portion, is reflected by said first curved surface part, and is further refracted by said front light-exit surface to form a first light output, and a second portion of light from said light source is refracted by said inner surrounding surface portion, is reflected by said second curved surface part, and is further refracted by said front light-exit surface to form a second light output;

wherein the first and second light outputs have an asymmetric distribution relative to a reference plane transverse to the optical axis (Z).

17. The bicycle headlight as claimed in claim 16, further comprising a circuit board disposed in said housing, said light source being a LED light source coupled electrically to said circuit board.

\* \* \* \* \*